United States Patent
Ciou et al.

(10) Patent No.: US 10,852,991 B1
(45) Date of Patent: Dec. 1, 2020

(54) MEMORY CONTROLLER AND MEMORY CONTROLLING METHOD WHERE NUMBER OF COMMANDS (EXECUTED BY THE MEMORY CONTROLLER PRIOR TO RELEASING HOST MEMORY) IS ADJUSTED BASED ON TRANSMISSION SPEED OF INTERFACE TO HOST

(71) Applicant: RAYMX Microelectronics Corp., Anhui (CN)

(72) Inventors: Min-Yan Ciou, Kaohsiung (TW); Cheng-Yu Chen, New Taipei (TW)

(73) Assignee: RAYMX MICROELECTRONICS CORP., Anhui (CN)

( * ) Notice: Subject to any disclaimer, the term of this patent is extended or adjusted under 35 U.S.C. 154(b) by 0 days.

(21) Appl. No.: 16/548,934

(22) Filed: Aug. 23, 2019

(30) Foreign Application Priority Data

May 30, 2019 (CN) .......................... 2019 1 0464541

(51) Int. Cl.
*G06F 3/06* (2006.01)
(52) U.S. Cl.
CPC .......... *G06F 3/0659* (2013.01); *G06F 3/0611* (2013.01); *G06F 3/0683* (2013.01)

(58) Field of Classification Search
CPC ..... G06F 3/0659; G06F 3/0611; G06F 3/0683
See application file for complete search history.

(56) References Cited

U.S. PATENT DOCUMENTS

| 2007/0260756 | A1* | 11/2007 | Tseng ...................... G06F 13/28 710/5 |
| 2008/0005490 | A1* | 1/2008 | Shiraki ................. G06F 3/0611 711/147 |
| 2013/0282927 | A1* | 10/2013 | Zhao ..................... G06F 3/0688 710/4 |
| 2019/0087129 | A1 | 3/2019 | You |

* cited by examiner

*Primary Examiner* — Reginald G Bragdon
*Assistant Examiner* — Chie Yew
(74) *Attorney, Agent, or Firm* — McClure, Qualey & Rodack, LLP (57) ABSTRACT

A memory controller includes an interface circuit and a control circuit. The interface circuit is configured to communicate with a host device. When the control circuit finishes executing N commands from the host device, the memory controller notifies the host device to release corresponding memory in the host device corresponding to the N commands, and N is a positive integer. The control circuit compares a data transmission speed of the interface circuit with a predetermined value to generate a comparison result, and the control circuit adjusts a value of N based on the comparison result.

15 Claims, 8 Drawing Sheets

MEMORY CONTROLLER AND MEMORY CONTROLLING METHOD WHERE NUMBER OF COMMANDS (EXECUTED BY THE MEMORY CONTROLLER PRIOR TO RELEASING HOST MEMORY) IS ADJUSTED BASED ON TRANSMISSION SPEED OF INTERFACE TO HOST

CROSS-REFERENCE TO RELATED APPLICATION

This application claims priority to China Application Serial Number 201910464541.2, filed May 30, 2019, which is herein incorporated by reference in its entirety.

BACKGROUND

Field of Invention

The present disclosure relates to a storage device. More particularly, the present disclosure relates to a storage device capable of increasing data transmission efficiency.

Description of Related Art

Commercially available electronic devices (e.g., Solid-state disk (SSD), Flash memory card) can access data through a variety of interface circuits (e.g., ATA, PCI-e, and USB). Some of the interface circuits (e.g., serial advanced technology attachment, SATA) is capable of supporting the native command queuing (NCQ) technology to increase the transmission efficiency of the interface. The NCQ technology allows multiple commands to be stored in a queue for being executed sequentially or in parallel, and thus the NCQ technology is different from the conventional sorting technology which needs to wait for the end of execution of a pervious command before receiving a next command.

Electronic device manufacturers have introduced a variety model of products (e.g., personal computers (PC), servers, notebooks, tablet, smart phone, etc.) to the market. The role of these products in data reading and writing operations is a host device. On the market, however, there are various host devices having different configurations, such as having different operating system (OS) or/and having different specification or/and different hardware architecture. If a slave device responds to the host devices with different configurations by only using the same operation mode, not only the overall transmission speed may not be increased, but the efficiency of both sides is also possibly decreased.

SUMMARY

The disclosure provides a memory controller including an interface circuit and a control circuit. The interface circuit is configured to communicate with a host device. When the control circuit finishes executing N commands transmitted from the host device, the memory controller notifies the host device to release corresponding memory in the host device corresponding to the N commands, and N is a positive integer. The control circuit compares a data transmission speed of the interface circuit with a predetermined value to generate a comparison result, and the control circuit adjusts a value of N based on the comparison result.

The disclosure provides a controlling method, applicable to a memory controller comprising an interface circuit and a control circuit, comprising following operations: utilizing the interface circuit to receive N commands transmitted from a host device; when the control circuit finishes executing the N commands, utilizing the control circuit to notify the host device to release corresponding memory in the host device corresponding to the N commands, wherein N is a positive integer; utilizing the control circuit to compare a data transmission speed of the interface circuit with a predetermined value to generate a comparison result; utilizing the control circuit to adjust a value of N based on the comparison result.

It is to be understood that both the foregoing general description and the following detailed description are by examples, and are intended to provide further explanation of the disclosure as claimed.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
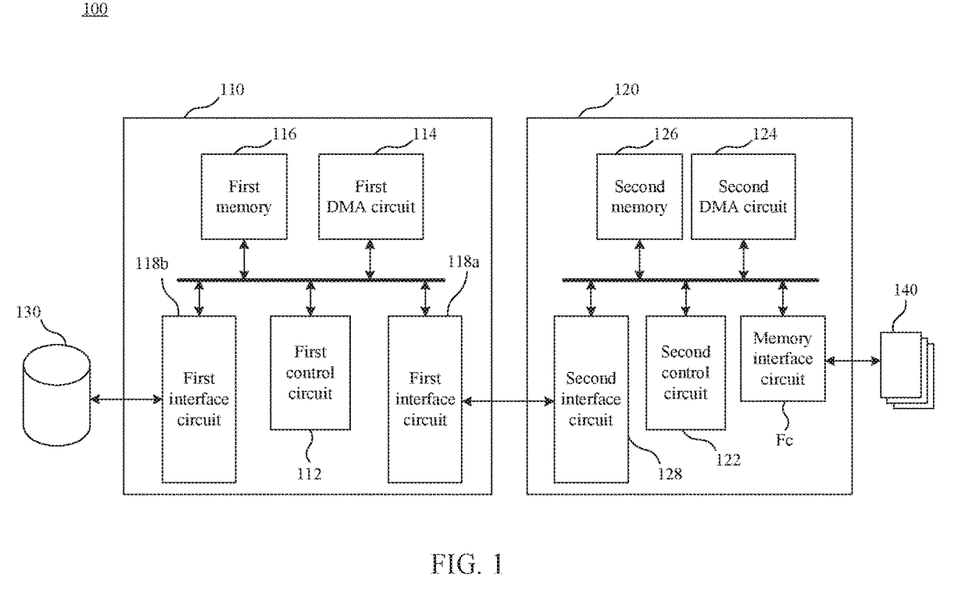
FIG. 1 is a simplified functional block diagram of a computer system according to one embodiment of the present disclosure.

FIG. 1 is a simplified functional block diagram of a computer system 100 according to one embodiment of the present disclosure. The computer system 100 comprises a host device 110, a memory controller 120, a storage device 130, and a memory module 140. The host device 110 and the storage device 130 may be partial circuits of an electronic device. For example, the host device 110 and the storage device 130 may respectively be a motherboard and a hard disk. The memory controller 120 and the memory module 140 may be partial circuits of another electronic device (e.g., SSD). For example, the memory controller 120 and the memory module 140 may respectively be a SSD controller and a NAND flash memory in the SSD. For the sake of brevity, other functional blocks of the computer system 100 are not shown in FIG. 1.

The host device 110 comprises a first control circuit 112, a first direct memory access (DMA) circuit 114, a first memory 116 (e.g., Main Memory), a first interface circuit 118a, and a first interface circuit 118b. The first interface circuit 118a is configured to conduct data communications with the memory controller 120. The first control circuit 112 is configured to control bidirectional data transmissions between the storage device 130 and the first memory 116. The first DMA circuit 114 is configured to conduct bidirectional data transmissions between the first memory 116 and the memory controller 120.

The memory controller 120 comprises a second control circuit 122, a second DMA circuit 124, a second memory 126, a second interface circuit 128, and a memory controller Fc. The second interface circuit 128 is configured to conduct data transmissions with the first interface circuit 118*a*. The second control circuit 122 is configured to control the second DMA circuit 124 and the memory interface circuit Fc according to commands transmitted from the host device 110. The second DMA circuit 124 is configured to conduct bidirectional data transmissions between the second memory 126 and the host device 110. The memory interface circuit Fc is configured to conduct bidirectional data transmissions between the second memory 126 and the memory module 140.

In an embodiment, the first interface circuit 118*a* and the second interface circuit 128 may be SATA interfaces, but this disclosure is not limited thereto. In one embodiment, the first interface circuit 118*b* may be a SATA interface or a peripheral component interconnect Express (PCIe) interface.

In an embodiment, data transmitted between the host device 110 and the memory controller 120 is encapsulated as frame information structure (FIS). For example, the command which the host device 110 transmits to the memory controller 120 is a host to device (H2D) FIS, and the command which the memory controller 120 responds to the host device 110 is a device to host (D2H) FIS. When the memory controller 120 finishes executing N (one or more) commands, the memory controller 120 transmits a set device bits (SDB) FIS to the host device 110, so as to notify the host device 110 to release memory allocated to the N commands, wherein N is an positive integer, and N≥1.

In a situation that the first memory 116 of the host device 110 has a small memory capacity or the first control circuit 112 has a slow processing speed, if the memory controller 120 transmits the SDB FIS for too few times (e.g., sending one SDB FIS after executing too many commands), the host device 110 would transmits hold primitives to the memory controller 120 continuously (for many times) because of insufficient memory space (since the first memory 116 is not efficiently released). In other hand, in a situation that the host device 110 has sufficient memory space or the first control circuit 112 has a fast processing speed, the fewer times the memory controller 120 transmits the SDB FIS, the better the transmission efficiency between the host device 110 and the memory controller 120.

Figure 2:
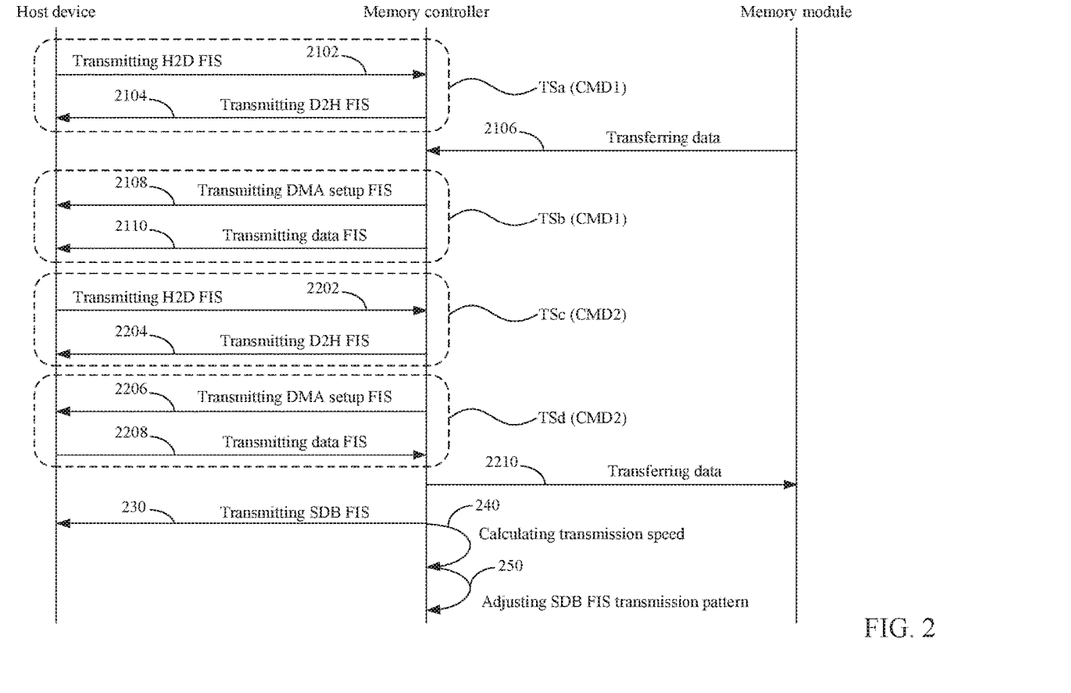
FIG. 2 is a flow chart of a memory controlling method according to one embodiment of the present disclosure.
Figure 3:
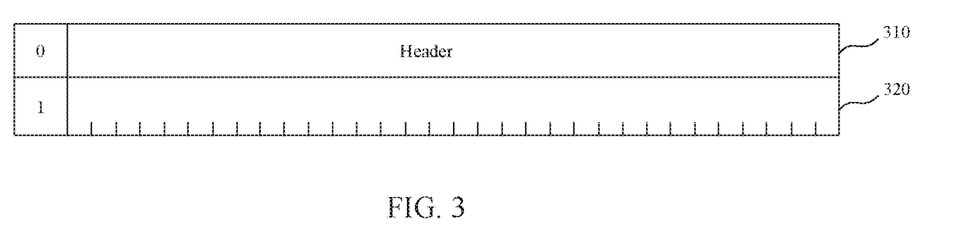
FIG. 3 is a simplified schematic diagram of a SDB FIS according to one embodiment of the present disclosure.

FIG. 2 is a flow chart of a memory controlling method according to one embodiment of the present disclosure. FIG. 3 is a simplified schematic diagram of a SDB FIS according to one embodiment of the present disclosure. The controlling method of FIG. 2 enables the memory controller 120 adaptively regulating transmission patterns of the SDB FIS according to the behaviors of the host device 110. Reference is made to FIGS. 1 through 3, the memory controller 120 may execute a command CMD1 transmitted from the host device 110. The content of the command CMD1 is to read data from the memory module 140, and the execution processes of the command CMD1 comprise transmission stages TSa-TSb.

In transmission stage TSa, the host device 110 transmits the command CMD1 to the memory controller 120 by using the H2D FIS (operation 2102). Then, the memory controller 120 responds to the host device 110, by using the D2H FIS, the command CMD1 has been received (operation 2104).

The memory interface circuit Fc of the memory controller 120 may transfer corresponding data from the memory module 140 to the second memory 126 for the following transmission (operation 2106).

In transmission stage TSb, the memory controller 120 transmits a DMA setup FIS to the host device 110, so as to notify the host device 110 to prepare to receive the corresponding data (operation 2108). Then, the memory controller 120 inserts the data to be transmitted into a data FIS, and transmits the data FIS to the host device 110 (operation 2110).

The memory controller 120 may also execute a command CMD2 transmitted from the host device 110. The content of the command CMD2 is to write data into the memory module 140, and the execution processes of the command CMD2 comprise transmission stages TSc-TSd.

In transmission stage TSc, the host device 110 transmits the command CMD2 to the memory controller 120 by using the H2D FIS (operation 2202). The second control circuit 122 responds to the host device 110, by using the D2H FIS, the command CMD2 has been received (operation 2204).

In transmission stage TSd, the memory controller 120 transmits DMA setup FIS to the host device 110, so as to notify the host device 110 to prepare to start data transmission (operation S2206). Then, the host device 110 inserts the data to be transmitted into a data FIS, and transmits the data FIS to the memory controller 120 (operation S2208).

Then, the memory controller 120 writes the received data into the memory module 140 (operation 2210).

In operation S230, the memory controller 120 transmits the SDB FIS to the host device 110, so that the host device 110 releases the memory of the first memory 116 corresponding to the commands CMD1 and CMD2.

Reference is made to FIG. 3, the SDB FIS comprises a header 310 and a field 320, and the field 320 has a 32-bit size. The header 310 may comprise an error entry, a FIS type entry, an interrupt entry, etc. Each of the bits of the field 320 represents one command sent by the host device 110. If a value of a bit is configured to be 1, the host device 110 is required to release corresponding memory. If a value of a bit is configured to be 0, the host device 110 needs not to release corresponding memory.

In this embodiment, the memory controller 120 may configure two bits, which are respectively corresponding to the commands CMD1 and CMD2, of the SDB FIS to 1, and may configure other bits to 0. For example, the memory controller 120 may configure the first and second bits of the SDB FIS as 1, and may configure the third through 32-th bits of the SDB FIS as 0.

In one embodiment, the type and content of an FIS are determined by the first control circuit 112 and the second control circuit 122 of FIG. 1, and the transmission of an FIS is conducted by the first DMA circuit 114 and the second DMA circuit 124. When the first DMA circuit 114 and the second DMA circuit 124 mutually transmit the data FISs, the first control circuit 112 and the second control circuit 122 need not to participate the transmission. As a result, the computing efficiency of the first control circuit 112 and the second control circuit 122 is improved.

For example, when the host device 110 receives the DMA setup FIS in operation 2108, the first control circuit 112 may load a physical region description table, which comprises the addresses of the first memory 116, into the first DMA circuit 114 to assign a size of the data to be received and addresses to store the data. Then, the first DMA circuit 114 may receive data FISs from the second DMA circuit 124 in operation 2110.

As another example, when the host device 110 receives the DMA setup FIS in operation 2206, the first control circuit 112 loads addresses of the first memory 116, which are corresponding to the data to be written, into the first DMA circuit 114. Then, the first DMA circuit 114 transmits the data to be written to the second DMA circuit 124 by using the data FISs.

In one embodiment, if the computer system 100 supports the NCQ technology, the second control circuit 122 further stores multiple commands from the host device 110 into a queue, and adjusts the execution sequence of the commands. In other words, the orders of the transmission stages of FIG. 2 is merely used for an exemplary illustration, and can be adjusted base on practical situations. For example, in a situation that the host device 110 transmits multiple commands at a time, the orders of the transmission stages TSb and TSc may be swapped.

As can be appreciated from the foregoing descriptions, before operation 230 is conducted, the memory controller 120 has finished two commands CMD1 and CMD2 from the host device 110, and each of the two commands comprises at least two transmission stages. The number of finished commands depicted in FIG. 2 is, however, an exemplary embodiment. Every time the memory controlling method of FIG. 2 is executed, before conducting operation 230, the memory controller 120 can actually finish executing totally N commands from the host device 110 (i.e., finishing at least 2N transmission stages), and N is a positive integer lower than or equal to 32. In this situation, in operation 230, the memory controller 120 configures N corresponding bits of the field 320 to 1, and configures other bits to 0, so as to notify the host device 110 to release memory of the first memory 116 which corresponding to the N commands, respectively. In the following paragraphs for continuing to explain the memory controlling method of FIG. 2, the memory controller 120 will be assumed to have finished N commands from the host device 110 before conducting operation 230.

In operation 240, the memory controller 120 calculates a transmission speed of the second interface circuit 128. Specifically, the second DMA circuit 124 notifies the second control circuit 122 at the beginning and end of each data transmission, for example, notifying the second control circuit 122 at the beginnings and ends of operations 2110 and 2208. Therefore, the memory controller 120 may calculate a time length, which the second DMA circuit 124 is busy, during the execution for the N commands. The memory controller 120 may further calculate the data transmission speed of the second interface circuit 128 according to the time length and a sum of sizes of the data FISs transmitted during the execution for the N commands.

Then, in operation 250, the memory controller 120 compares the transmission speed of the second interface circuit 128 with a predetermined value. If the comparison result is that the transmission speed of the second interface circuit 128 is lower than the predetermined value, the memory controller 120 adjusts a number of commands which are finished before the SDB FIS is transmitted (i.e., before operation 230). The specific regulating method will be further illustrated by reference to FIGS. 4A and 4B. Of course, if the comparison result is that the transmission speed of the second interface circuit 128 is higher than the predetermined value, the memory controller 120 may increase the number of commands finished before the SDB FIS is transmitted, until the transmission speed is completely optimized.

Figure 4A:
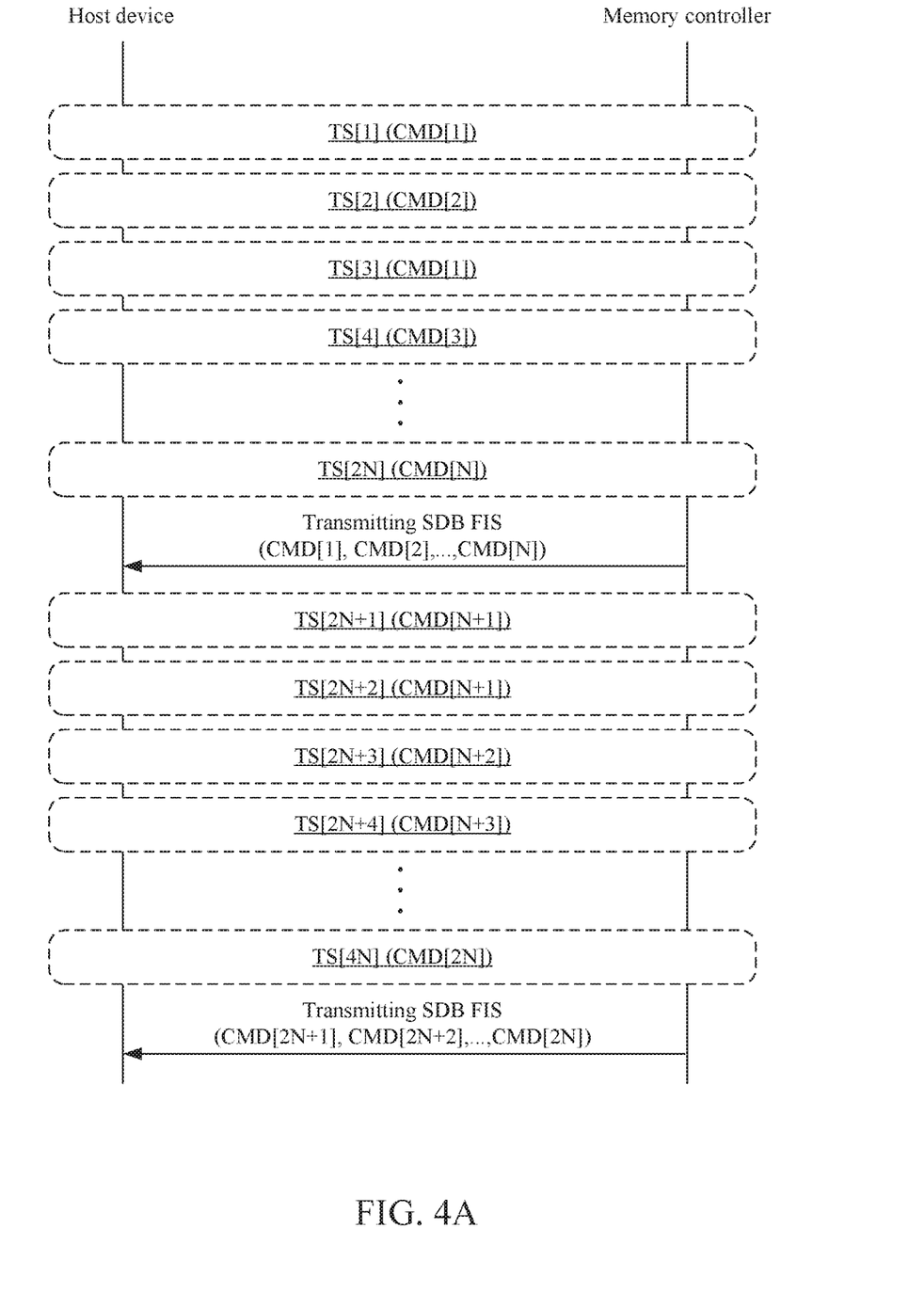
FIGS. 4A and 4B are simplified schematic diagrams showing the regulation of a transmission pattern of SDB FISs when the computer system executes the memory controlling method of FIG. 2.

As shown in FIG. 4A, the memory controller 120 transmits, by default, the SDB FIS once every N commands (e.g., commands CMD[1]–CMD[N] or commands CMD[N+1]– CMD[2N]) are finished. That is, the memory controller 120 transmits the SDB FIS once every 2N transmission stages (e.g., transmission stages TS[1]–TS[2N] or transmission stages TS[2N+1]–TS[4N]) are finished.

Figure 4B:
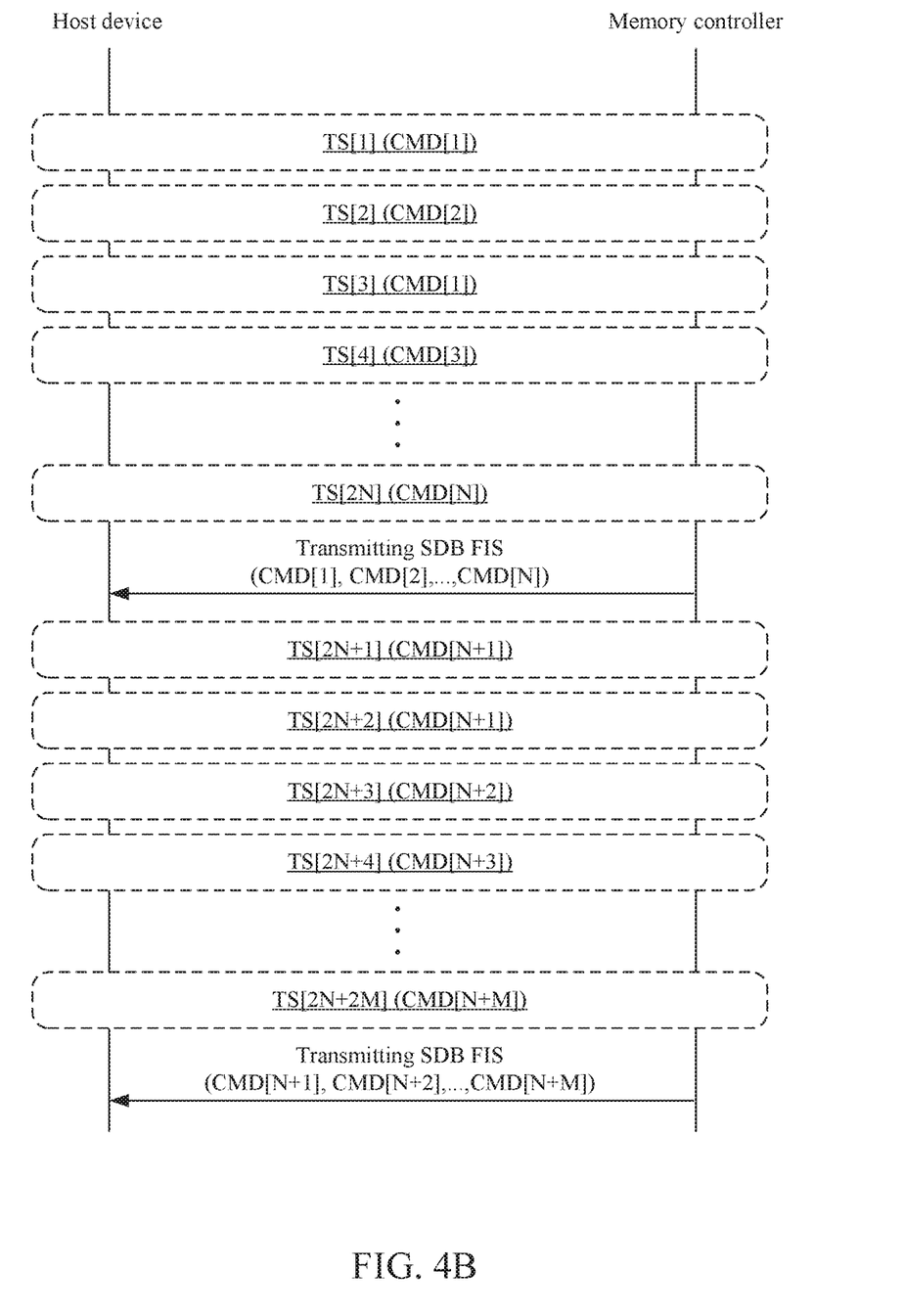

If the transmission speed of the second interface circuit 128 is determined to be lower than the predetermined value in operation 250, the memory controller 120 may, as shown in FIG. 4B, switches to transmit the SDB FIS once every M commands (e.g., commands CMD[N+1]–CMD[N+M]) are finished, where M is different from N, and M is a positive integer less than or equal to 32. That is, the memory controller 120 switches to transmit the SDB FIS once at least every 2M transmission stages (e.g., transmission stages TS[2N+1]–TS[2N+2M]) are finished. In this case, when operation 230 of FIG. 2 is conducted again, the memory controller 120 adjusts the number of bits, which are configured to be 1, of the SDB FIS from N to M. The host device 110 is then notified to release the addresses corresponding to the M commands (e.g., the commands CMD[N+1]–CMD [N+M]).

The computer system 100 may execute the memory controlling method of FIG. 2 for multiple times, so that the memory controller 120 may adaptively optimize the data transmission efficiency according to the configuration of the host device 110. The aforesaid configuration may be a combination of one or more the following elements of the host device 110: the control circuit architecture of the first control circuit 112, the southbridge, the northbridge, the capacity of the first memory 116, the advanced host controller interface (AHCI) architecture, the OS, the driver software, and whether the NCQ technology is activated. In an embodiment that the host device 110 has a slow processing speed or a RAM with small capacity, the computer system 100 may reduce the value of N (e.g., adjusting N from 16 to 7) to increase the times the host device 110 releasing the memory. As a result, the times the host device 110 required for pausing the data transmission, which is caused by insufficient memory space due to release for too less times, is decreased. In another embodiment that the host device 110 has sufficient RAM capacity or high processing speed, the computer system 100 may increase the value of N (e.g., adjusting N from 16 to 30). As a result, the time period required by the memory controller 120 for transmitting the SDB FISs is reduced, the data transmission efficiency between the host device 110 and the memory controller 120 is increased, and the processing efficiency of the memory controller 120 is improved.

In addition, after the memory controller 120 adjusts the value of N, when the value of N is larger than or equal to 2, the memory controller 120 may determine that the host device supports the NCQ technology. Among the various host devices supporting the NCQ technology, however, some of the host devices have higher processing speed regard to the data returned in disorder, while other host devices have higher processing speed regard to the data returned sequentially.

Figure 5:
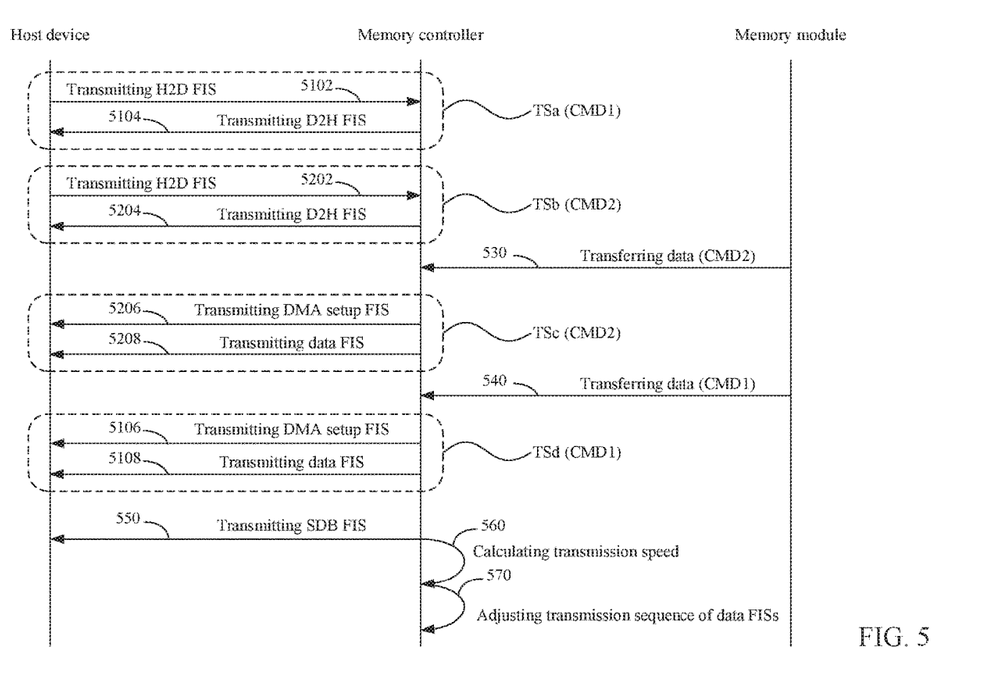
FIG. 5 is a flow chart of a memory controlling method according to another embodiment of the present disclosure.

FIG. 5 is a flow chart of a memory controlling method according to another embodiment of the present disclosure. The memory controlling method of FIG. 5 enables the memory controller 120 adaptively regulating the return order of data according to the behavior of the host device 110. In the embodiment of FIG. 5, the memory controller 120 executes commands CMD1 and CMD2, and the content of the commands CMD1 and CMD2 are both reading data from the memory module 140. The execution processes of the command CMD1 comprise transmission stages TSa and TSc. The execution processes of the command CMD2 comprise transmission stages TSb and TSd.

In transmission stage TSa, the host device 110 may transmit the command CMD1 to the memory controller 120 by using the H2D FIS (operation 5102). The memory controller 120 may respond to the host device 110 that the command CMD 1 is received by using the D2H FIS (operation 5104) Then, in transmission stage TSb, the host device 110 may transmit the command CMD2 to the memory controller 120 by using the H2D FIS (operation 5202). The memory controller 120 may respond to the host device 110 that the command CMD2 is received by using the D2H FIS (operation 5204).

In this embodiment, due to the variation of storage addresses and/or size of data, the memory controller 120 may, relatively quickly, access the data corresponding to the command CMD2 from the memory module 140, and access, relatively slowly, the data corresponding to the command CMD1. That is, the memory interface circuit Fc may transfer, relatively quickly, the data corresponding to the command CMD2 from the memory module 140 to the second memory 126 for transmission (operation 530).

As can be appreciated from the foregoing descriptions, the memory controller 120 can determines the execution order of multiple commands from the host device 110, and needs not to execute the multiple commands in an order in which the multiple commands are received. Therefore, the memory controller 120 then conducts transmission stage TSc, so as to transmit the data corresponding to the command CMD2 to the host device 110. In transmission stage TSc, operations 5206 and 5208 are respectively similar to operations 2108 and 2110 of FIG. 2, the difference is that the data FIS corresponding to the command CMD2 is transmitted in operation 5208. For the sake of brevity, those corresponding descriptions of operations 5206 and 5208 will not be repeated here.

Then, the memory interface circuit Fc may transfer the data corresponding to the command CMD1 from the memory module 140 to the second memory 126 for transmission (operation 540). The memory controller 120 then conducts the transmission stage TSd, so as to transmit the data corresponding to the command CMD1 to the host device 110. In transmission stage TSd, operations 5106 and 5108 are respectively similar to operations 2108 and 2110 of FIG. 2, and the difference is that the data FIS CMD1 is transmitted in operation 5108. For the sake of brevity, those corresponding descriptions of operations 5106 and 5108 will not be repeated here.

In addition, operation 550 of FIG. 5 is similar to operation 230 of FIG. 2. For the sake of brevity, those corresponding descriptions of operation 550 will not be repeated here.

As aforementioned, the memory controller 120 may transmit corresponding data without following the receiving order in which the commands CMD1 and CMD2 are received. The memory controller 120 improves work efficiency by transmitting the data, which is accessed in an earlier order, in advanced.

The two commands CMD1 and CMD2 of FIG. 5 are merely an exemplary embodiment for illustrating convenience. In practice, in each time the memory controlling method of FIG. 5 is executed, the computer system 100 may finish totally N commands before conducting operation 550, and N is a positive integer smaller than or equal to 32. In the following paragraphs for continuing to explain the memory controlling method of FIG. 5, the memory controller 120 will be assumed to have finished N commands from the host device 110 before conducting operation 550.

In operation 560, the memory controller 120 calculates the transmission speed of the second interface circuit 128 by a method similar to operation 240 of FIG. 2. In operation 570, the memory controller 120 compares the transmission speed of the second interface circuit 128 with a predetermined value. If the transmission speed of the second interface circuit 128 is lower than the predetermined value, and the aforementioned N commands comprises i read commands, the memory controller 120 may adjust a transmission sequence of the i data corresponding to the i read commands.

Specifically, the memory controller 120 may adjust the transmission sequence of the i data from corresponding to a sequence in which the i data are accessed (i.e., the sequence transferring to the second memory 126) to corresponding to a sequence in which the i read commands are received, and I is a positive integer smaller than or equal to N. For example, the memory controller 120 may swap the execution orders of transmission stages TSc and TSd of FIG. 5. The detailed regulation method will be further described by reference to FIGS. 6A and 6B.

Figure 6A:
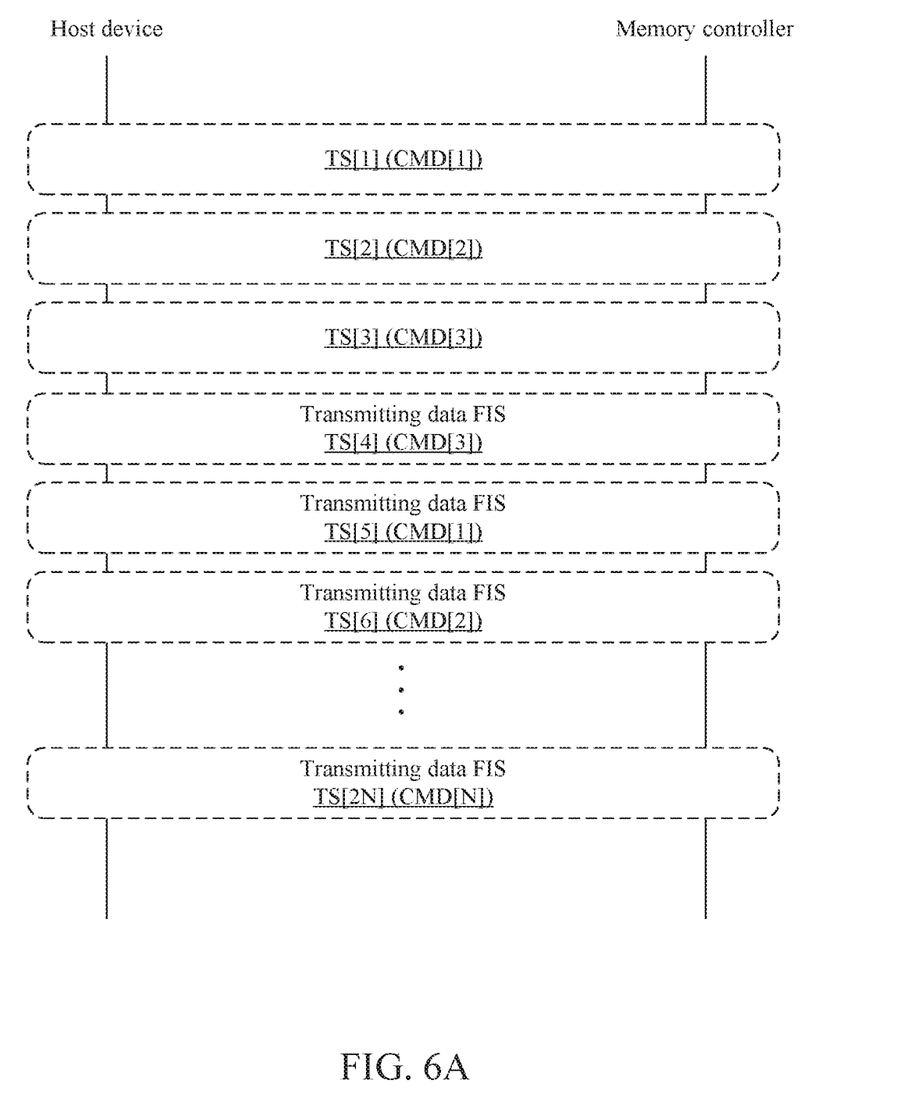
FIGS. 6A and 6B are simplified schematic diagrams showing the regulation of execution orders of multiple read commands when the computer system executes the memory controlling method of FIG. 5.
Figure 6B:
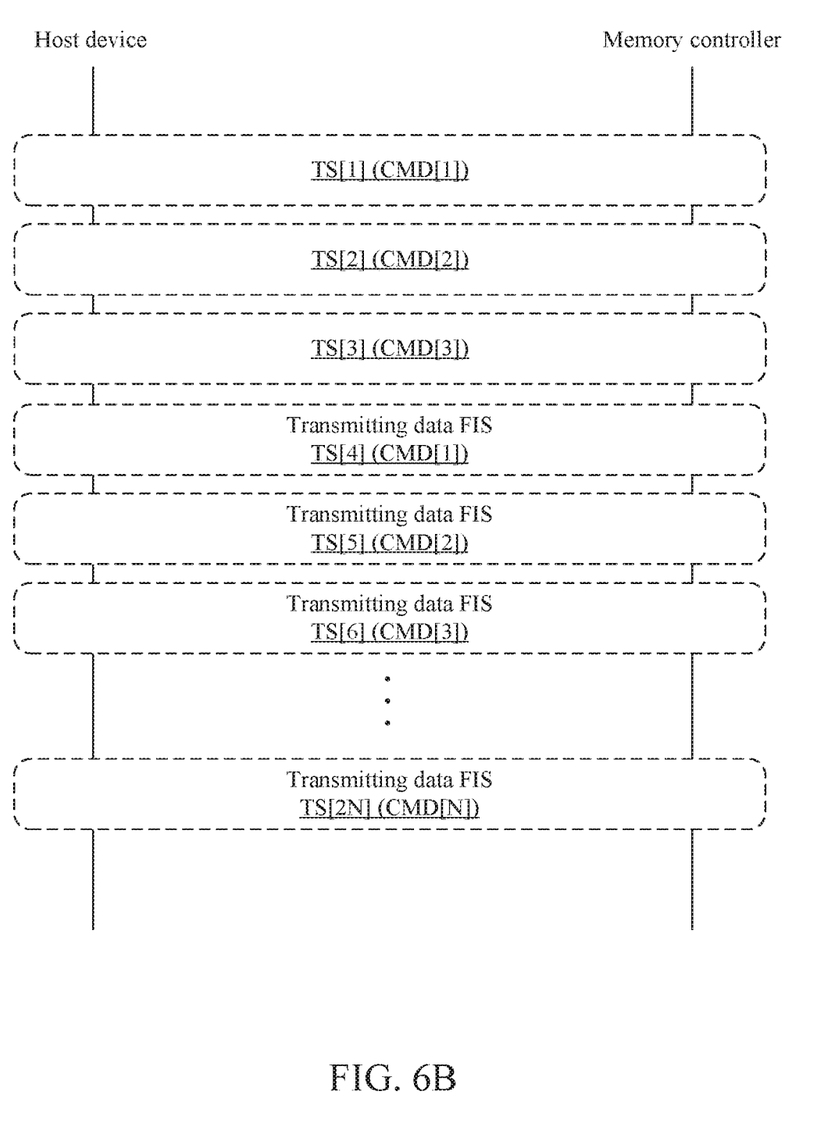

For the convenience of explanation, FIGS. 6A and 6B only show read commands CMD[1]-CMD[N] and corresponding transmission stages TS[1]-TS[2N], and the write commands are omitted. As shown in FIG. 6A, the memory controller 120 transmits, by default, the data accessed in an earlier order in advanced. That is, the transmission sequence in which the memory controller 120 transmits the data FISs is corresponding to a sequence in which the corresponding multiple data are transferred to the second memory 126 (e.g., 3, 1, 2, . . . , N).

If the transmission speed of the second interface circuit 128 is determined to be lower than the predetermined value in operation 560, the memory controller 120 may switch the transmission sequence of the data FISs to corresponding to the sequence in which the corresponding read commands are received (i.e., 1, 2, 3, . . . , N).

In one embodiment, since the DMA setup FIS and the data FIS are transmitted in the same transmission stage, the memory controller 120 may also adjust the transmission sequence of the DMA setup FISs when regulating the transmission sequence of the data FISs. That is, the memory controller 120 may adjust the transmission sequence of the DMA setup FIS from corresponding to a sequence in which the corresponding multiple data are accessed to corresponding to a sequence in which the corresponding read commands are received.

In some embodiments, the memory controller 120 transmits, by default, the corresponding data FISs and/or DMA setup FISs according to the sequence in which the read commands are received. If the transmission speed of the second interface circuit 128 is lower than the predetermined value, the memory controller 120 may switch the transmission sequence of the data FISs and/or the DMA setup FISs to corresponding to the sequence in which the corresponding multiple data are accessed.

In other embodiments, when the transmission speed of the second interface circuit 128 is higher than the predetermined value, the memory controller 120 may also not to switch the transmission sequence of the data FISs and/or the DMA setup FISs.

Notably, the memory controlling methods of FIGS. 2 and 5 may be combined with each other. Operation 250 of FIG. 2 may comprise procedures corresponding to operation 570 of FIG. 5, and operation 570 of FIG. 5 may also comprise procedures corresponding to operation 250 of FIG. 2. That is, in some embodiments, the memory controlling method is capable of regulating both of the transmission pattern of the SDB FISs and the transmission sequence of the data FISs of the memory controller 120.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A memory controller, comprising:
   an interface circuit, configured to communicate with a host device; and
   a control circuit, wherein when the control circuit finishes executing N commands from the host device, the memory controller notifies the host device to release corresponding memory in the host device corresponding to the N commands, and said N is a positive integer,
   wherein the control circuit compares a data transmission speed of the interface circuit with a predetermined value to generate a comparison result, and adjusts said N based on the comparison result.

2. The memory controller of claim 1, wherein the memory controller transmits a set device bit (SDB) frame information structure (FIS) to the host device, so as to notify the host device to release the corresponding memory corresponding to the N commands,
   wherein the SDB FIS comprises a first field comprising a plurality of bits, and each of the plurality of bits represents one command among the N commands transmitted from the host device.

3. The memory controller of claim 2, wherein the memory controller selects one of a first rule and a second rule according to the comparison result, so as to determine how to transmit a plurality of data FISs corresponding to a plurality of read commands among the N commands,
   wherein the first rule comprises: a transmission sequence of the plurality of data FISs is corresponding to an accessing sequence in which the memory controller accesses a plurality of data from a memory module, the plurality of data corresponding to the plurality of read commands,
   wherein the second rule comprises: the transmission sequence of the plurality of data FISs is corresponding to a receiving sequence in which the memory controller receives the plurality of read commands from the host device.

4. The memory controller of claim 3, wherein the memory controller transmits a plurality of DMA setup FISs, corresponding to the plurality of read commands, to the host device, and the first rule further comprises: a transmission sequence of the plurality of DMA setup FISs is corresponding to the accessing sequence in which the memory controller accesses the plurality of data,
   wherein the second rule further comprises: the transmission sequence of the plurality of DMA setup FISs is corresponding to the receiving sequence in which the memory controller receives the plurality of read commands from the host device.

5. The memory controller of claim 1, wherein the control circuit calculates a time length for transmitting a plurality of data FISs corresponding to the N commands,
   wherein the control circuit calculates the data transmission speed based on the time length and a sum of sizes of the plurality of data FISs.

6. The memory controller of claim 5, further comprising:
   a DMA circuit, configured to transmit the plurality of data FISs to the host device through the interface circuit,
   wherein the DMA circuit notifies the control circuit at a beginning and an end of a transmission of each of the plurality of data FISs, so that the control circuit is capable of calculating the time length.

7. The memory controller of claim 1, wherein the control circuit adjusts said N based on the comparison result, and when said N is larger than 1, the control circuit determines that a configuration of the host device supports a native command queuing (NCQ) technology.

8. The memory controller of claim 1, wherein the interface circuit comprises a serial advanced technology attachment (SATA) interface.

9. A controlling method, applicable to a memory controller, comprising:
   receiving N commands transmitted from a host device;
   executing the N commands;
   notifying the host device to release corresponding memory in the host device corresponding to the N commands after the N commands are executed, wherein said N is a positive integer;
   comparing a data transmission speed of the interface circuit with a predetermined value to generate a comparison result; and
   adjusting said N based on the comparison result.

10. The method of claim 9, wherein the step of notifying the host device to release the corresponding memory corresponding to the N commands comprises:
    transmitting a SDB FIS to the host device, wherein the SDB FIS comprises a first field comprising a plurality of bits, and each of the plurality of bits represents one command among the N commands transmitted from the host device.

11. The method of claim 10, further comprising:
    selecting one of a first rule and a second rule according to the comparison result, so as to determine how to transmit a plurality of data FISs corresponding to a plurality of read commands among the N commands,
    wherein the first rule comprises: a transmission sequence of the plurality of data FISs is corresponding to an accessing sequence in which the memory controller accesses a plurality of data from a memory module, the plurality of data corresponding to the plurality of read commands, wherein the second rule comprises: the transmission sequence of the plurality of data FISs is corresponding to a receiving sequence in which the memory controller receives the plurality of read commands from the host device.

12. The method of claim 9, wherein the step of comparing the data transmission speed of the interface circuit with the predetermined value comprises:
   calculating a time length for transmitting a plurality of data FISs corresponding to the N commands; and
   calculating the data transmission speed based on the time length and a sum of sizes of the plurality of data FISs.

13. The method of claim 12, wherein the time length is calculated according to a beginning and an end of a transmission of each of the plurality of data FISs.

14. The method of claim 9, further comprising:
   comparing said N with 1 to determine whether a configuration of the host device supports a NCQ technology or not.

15. The method of claim 9, wherein the memory controller comprises a serial advanced technology attachment (SATA) interface configured to couple to the host device.

* * * * *